United States Patent
Iida

(10) Patent No.: US 6,401,643 B2
(45) Date of Patent: Jun. 11, 2002

(54) SEWN COVER ASSEMBLY AND PRODUCT FOAMED THEREWITH

(75) Inventor: Makoto Iida, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/828,206

(22) Filed: Apr. 9, 2001

(51) Int. Cl.[7] .............................................. D05B 1/26
(52) U.S. Cl. ................................................ 112/470.27
(58) Field of Search ........................... 112/475.08, 440, 112/441, 470.27

(56) References Cited

U.S. PATENT DOCUMENTS

| | | | | |
|---|---|---|---|---|
| 3,424,161 A | * | 1/1969 | Scheier ...................... | 112/41 X |
| 5,492,073 A | * | 2/1996 | Abraham ..................... | 112/441 |
| 5,687,662 A | * | 11/1997 | Kawasaki .............. | 112/475.08 |
| 5,961,019 A | * | 10/1999 | Gleason et al. ................ | 112/41 |
| 6,164,226 A | * | 12/2000 | Takei ..................... | 112/475.08 |

FOREIGN PATENT DOCUMENTS

| | | |
|---|---|---|
| JP | 8-71268 | 3/1996 |
| JP | 8-243271 | 9/1996 |
| JP | 8-309765 | 11/1996 |

* cited by examiner

Primary Examiner—Ismael Izaguirre
(74) Attorney, Agent, or Firm—Browdy and Neimark

(57) ABSTRACT

A sewn cover assembly of a type that is to undergo a foaming process involving injection and curing of a liquid foaming material therein. The cover assembly is formed by sewing together plural cover elements via two different sewing threads, using a sewing machine, so as to completely close and seal the needle holes formed therein against leakage of the liquid foaming material through the needle holes. Namely, one of the two threads used is large in thickness relative to another of them, thereby serving as a leakage preventive member in addition to being a sewing thread. A foamed product is also disclosed, which is formed by injecting and curing a liquid foaming material in such sewn cover assembly.

16 Claims, 3 Drawing Sheets

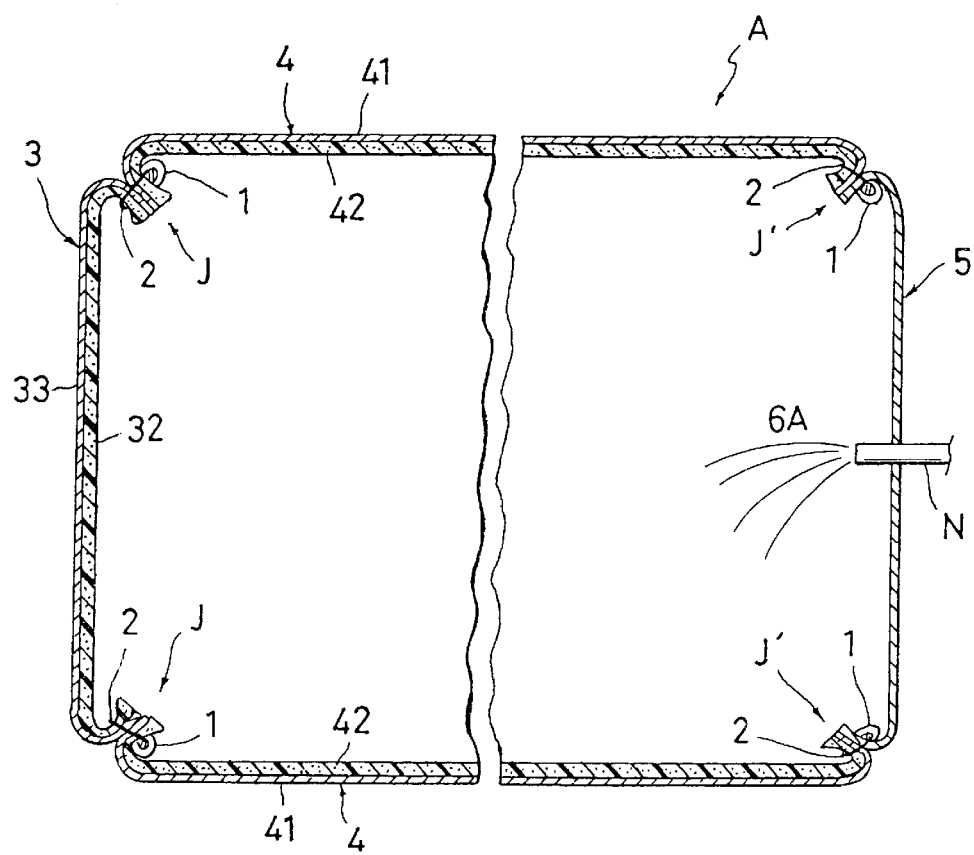
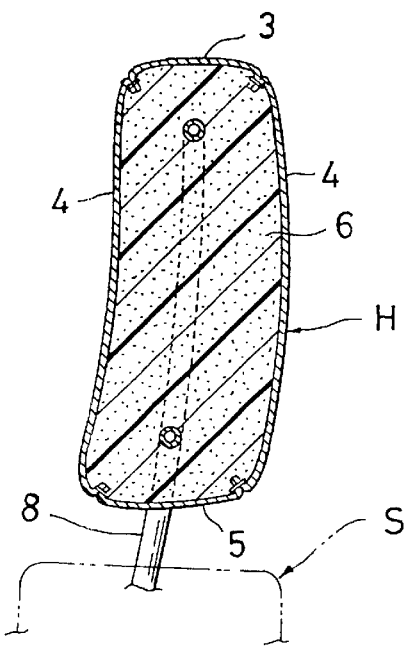
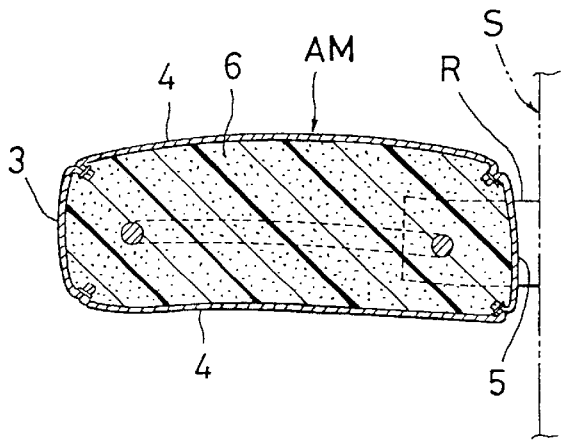

SEWN COVER ASSEMBLY AND PRODUCT FOAMED THEREWITH

BACKGROUND OF INVENTION

1. Field of the Invention

The present invention relates to a sewn cover assembly having a foam layer integral therewith, which is formed by sewing plural separate cover materials together and subjecting them to foaming to create a foam layer integrally therewith, and also to a product which is formed by foaming process integrally with such sewn cover assembly to create a foam cushion member within the sewn cover assembly.

2. Description of Prior Art

What is known as a trim cover assembly is normally formed from a surface cover layer and foamed padding layer in an integral fashion and used to cover a vehicle or automotive seat and associated parts thereof, such as a headrest or armrest. In particular, the headrest or armrest is formed, using a closed three-dimensional trim cover assembly and subjecting it to a foaming process. According to ordinary process for forming the headrest or armrest, plural separate cover sections are sewn together by a sewing machine to form a three-dimensional body of trim cover assembly and then a liquid foaming material is injected and cured in the hollow inside of the so sewn trim cover assembly to create a foamed cushion member therewithin.

The problem inherit in this process is a high likelihood of the liquid foaming material being leaked from the sewn jointed points of trim cover assembly where plural cover materials are sewn together to form the trim cover assembly, or strictly stated, through the needle holes formed by sewing machine needle in the jointed seam areas of trim cover assembly.

To avoid such leakage problem, various ways have been done and proposed. For example, the Japanese Laid-Open Patent Publication No. 8-309765 suggests an overlock sewing method by which both extreme ends of two covering members are juxtaposed with each other and sewn together in an overlock manner, using the combination of thin and thick threads, to forcibly close each needle hole in an attempt to prevent leakage of a liquid foaming material therethrough. Further, the Japanese Laid-Open Patent Publication No. 8-243271 suggests to use an elastic piece and sewing it to and along a sewn line or seam at which two covering members are sewn together so that the elastic piece serves to fill the needle holes in the seam.

However, those hitherto techniques have been found defective in expensive, troublesome sewing processes requiring a particular sewing machine like overlock machine and plural different threads in the case of the former (8-309765) and requiring additional step of sewing a leakage preventive material to the seam of sewn trim cover assembly in the case of the latter (8-243271).

SUMMARY OF THE INVENTION

In view of the above-stated drawbacks, it is a primary purpose of the present invention to provide a sewn cover assembly which is easy to form and completely prevents leakage of liquid foaming material through needle holes formed therein.

To achieve such purpose, a sewn cover assembly of the present invention is basically comprised of:

plural cover elements, each being preformed in a predetermined shape;

said plural cover elements being sewn together by a sewing machine, using a first thread and a second thread, into a predetermined configuration of the sewn cover assembly, wherein said first thread is of an elastic and flexible property and is large in thickness relative to said second thread.

Accordingly, the first thread is partly collapsed resiliently points by the second thread and further forcibly inserted into needle holes formed in the juxtaposed cover elements together with the second thread. Thus, such forcible insertion of both two threads in the needle hole completely closes and seals the needle hole itself against leakage of a liquid foaming material through the needle holes during a foaming process wherein the liquid foaming material is injected and cured in the predetermined configuration of sewn cover assembly.

Preferably, the first thread may be 5 to 20 times as thick as the second thread.

One preferred mode of the first thread may be a simple thread of such large thickness, such as a woolen yarn, or alternatively, another preferred mode the same be a twisted thread which is formed by spinning and twisting a long tape of elastic material, such as a long tape of wooly nylon or non-woven fabric material.

It is another purpose of the present invention to provide a product foamed integrally with the above-described sewn cover assembly.

For that purpose, a liquid foaming material is injected and cured in the sewn cover assembly to create a foam cushion member therein in an integral manner, so that a resulting product is obtained without any leakage of the liquid foaming material through the needle holes in the cover assembly. The resulting product may be used in any desired forms. For example, in the case where the predetermined configuration of sewn cover assembly is a box-like three-dimensional trim cover assembly for headrest, the resulting product may comprise a headrest for use on an automotive seat, the headrest being formed such that a headrest frame is placed in the box-like three-dimensional trim cover assembly and provided therein integrally with the foam cushion member. In the case where the predetermined configuration of sewn cover assembly is a box-like three-dimensional trim cover assembly for armrest, the resulting product may comprise an armrest for use with an automotive seat, the armrest being formed such that an armrest frame is placed in the box-like three-dimensional trim cover assembly and provided integrally with said foam cushion member.

In one aspect of the present invention, because of the above-discussed complete filling of needle hoes effected by insertion of thick thread, it is optionally possible that at least one of the plural cover elements may be of one layer structure comprising only one surface cover member while another of the plural cover elements may be of at least two-layer lamination structure comprising a surface cover layer and a foam padding layer integral therewith.

Other various features and advantages of the present invention will become apparent from reading of the descriptions hereinafter with reference to the annexed drawings

BRIEF DESCRIPTION OF THE DRAWINGS

FIG. 6 is a partly broken sectional view showing an exemplary mode of the sewn cover assembly which comprises a box-like three-dimensional trim cover assembly;

FIG. 7 is a schematic partly broken sectional view showing one exemplary headrest mode of product which is obtained by subjecting the trim cover assembly of the FIG. 6 to a foaming process, wherein a foam cushion member is created in the trim cover assembly together with a headrest frame into a headrest for use on an automotive seat; and FIG. 8 is a schematic partly broken sectional view showing one exemplary armrest mode of product which is obtained by subjecting the trim cover assembly of the FIG. 6 to a foaming process, wherein a foam cushion member is created in the trim cover assembly together with an armrest frame into an armrest for use with an automotive seat;

DETAILED DESCRIPTION OF PREFERRED EMBODIMENTS OF THE INVENTION

Referring to FIGS. 1 through 9, there are illustrated preferred modes of sewn trim cover assembly and product foamed therewithin in accordance with the present invention.

Figure 1:
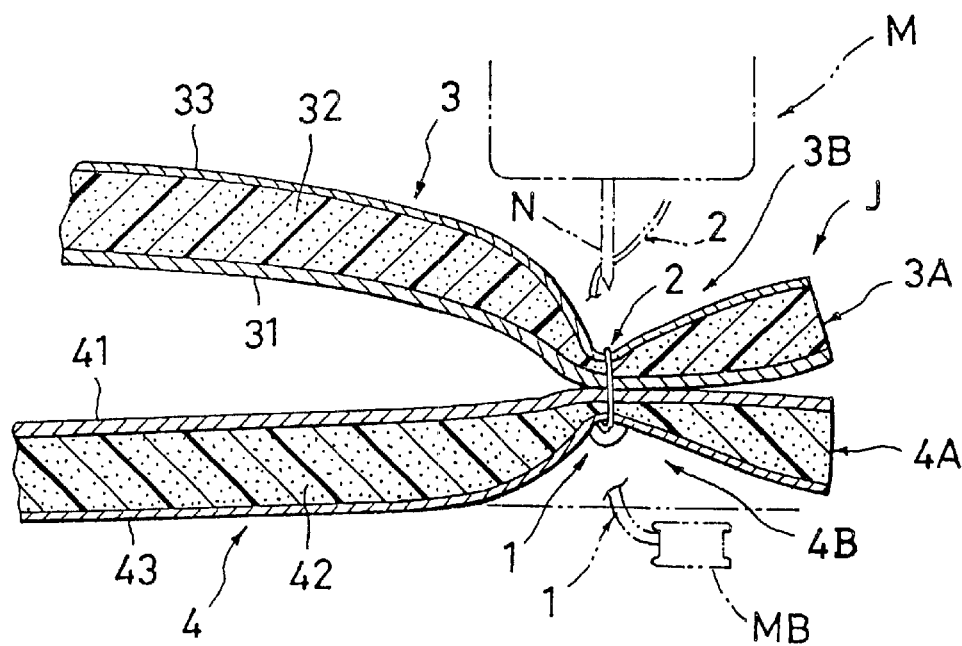
FIG. 1 is a fragmentary sectional view of a sewn cover assembly in accordance with the present invention, which shows how two cover elements are sewn together, using first and second threads, by means of a sewing machine.
Figure 2:
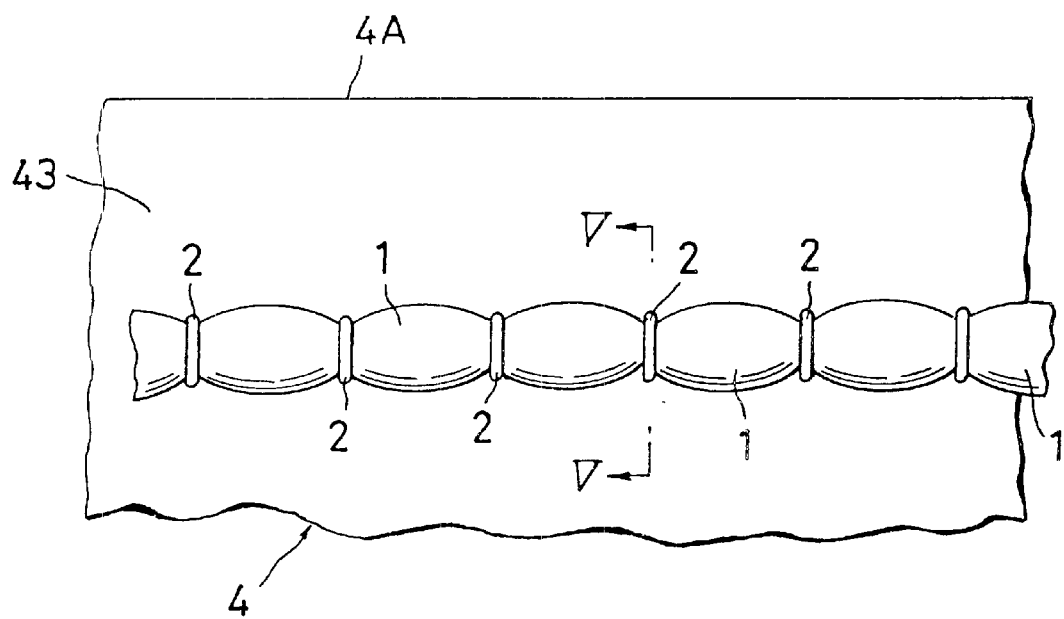
FIG. 2 is a fragmentary enlarged plan view showing one side of the sewn cover assembly shown in FIG. 1, where a principal part thereof is depicted.

FIG. 1 shows the state where a pair of separate first and second covering elements (3) (4), each being of a two-layer lamination structure, are sewn together at their end portions, by way of example, leaving a margin to seam, wherein a jointed portion (J) is defined between the two covering elements. FIG. 2 is a view showing one side of the thus-formed trim cover assembly as looked from the second covering elements (4). As shown in FIG. 1, the first covering element (3) has a surface cover layer (31) and an inner foam padding layer (32) (e.g. a slab urethane foam), both of which are formed integrally together. Likewise formed is the second covering element (4) which has an integral lamination of a surface cover layer (41) and an inner foam padding layer (42) as well. Each of the covering elements (3) (4) is formed from such a material as a textile fabric, a non-woven fabric or a knitted fabric, and trimmed in a predetermined shape in advance, considering a resultant desired configuration of trim cover assembly. Designations (33) and (43) each denotes a cured film layer which is formed by heat fusing and curing an outer surface of the corresponding foam padding layer (32 or 42). The film layer serves to prevent impregnation of a liquid foaming material (see the designation 6A in FIG. 7) during a subsequent foaming process to be described later. This is however not limitative, but any other suitable impregnation preventive means may be applied to the foam padding layer (32, 42).

As can be seen by the solid lines and one-dot chain lines in FIG. 1 and from FIG. 2, the two covering elements (3) (4) are sewn together rectilinearly along their respective rectilinear sewing lines (3B) (4B) by means of a sewing machine (M), using a first sewing thread (1) and a second sewing thread (2). As with most ordinary sewing machines, the first thread (1) is wound about a bobbin (MB) provided in a sewing machine table and may be fed outwardly therefrom towards the needle (N), while on the other hand, the second thread (2) is provided at the sewing machine body (M) and may be fed via the sewing needle (N) to the juxtaposed covering elements (3, 4), so that the first and second threads (1) (2) are intertwisted at intervals in the covering elements during the sewing operation. In that sense, as far as the present embodiment is concerned, it can be defined that the first thread (1) is the so-called "bobbin thread" and the second thread (2) is the so-called "needle thread".

According to the present invention, the second thread (2) (or needle thread) used is a strong thread or any other thread of a relatively hard synthetic resin material which is generally for use with sewing machine. In any case, the second thread should be the one that serves the sewing purpose of the present invention, and preferably it be a yarn-count "No. 8" synthetic resin thread. By contrast, the first thread (1) (or bobbin thread) used is large in thickness relative to the second thread (2), as seen in FIG. 2. The generic mode of first thread (1) contemplated by the present invention is a thick thread with an elastic and flexible property, which has a diameter larger than that of the first thread ( 1) and has a certain elastic recovery force given in the radial direction thereof. This is intended to prevent leakage of a liquid foaming material and other various advantageous effects which will become apparent in the following descriptions. Such inventive concept will be embodied and described hereinafter, by way of preferred examples, with particular reference to FIGS. 3 to 7. Of course, those modes are not limitative, but the first thread (1) per se may be in any form to attain such elastic and thick (i.e. large diameter) property as typically shown in FIGS. 2 and 5.

Figure 3:
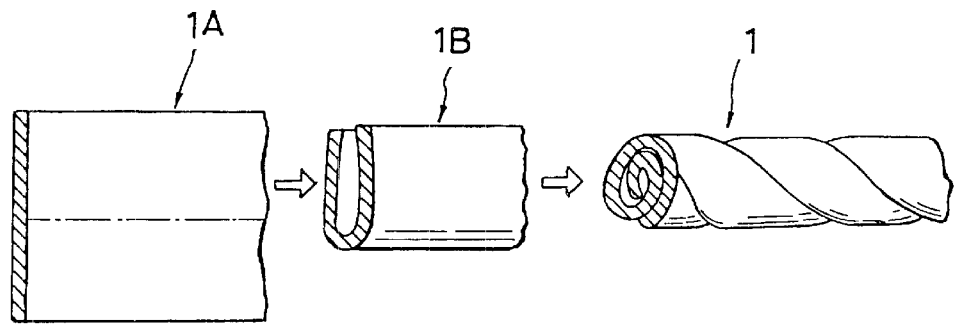
FIG. 3 is a diagram showing one exemplary mode of the first thread and illustrating how the first thread is formed into a twisted mode.

Reference is now made to FIG. 3 showing one exemplary method for forming the first thread (1) and resultant mode thereof. In this instance, a long tape of elastic and flexible material may be used, as shown by the designation (1A). This long tape (1A) is wound about the bobbin (MB). As illustrated, it is so arranged that the tape (1A), upon being fed from the bobbin, is automatically folded in relation to a center line into a generally U-shaped folded tape (1B) and then the thus-folded tape (1B) is subjected to spinning into a twisted thread mode having a generally circular cross-section as designated by (1). This spinning may be conducted by any suitable known spinning mechanism for causing twisting of thread, but its detailed explanation is deleted. In this mode, it is preferable to use a long tape of woolly nylon, non-woven fabric or the like, which is of such dimension that, after having been spun into a twisted thread, it becomes about 5 to 20 times as thick as the second thread (2). In particular, if the woolly nylon is employed, it is best preferable to use a woolly nylon tape being 5 mm wide and 1 to 2 mm thick. Accordingly, the initial flat tape state of base thread material is transformed and swollen by spinning into a columnar shape or thread shape in which plural helical layers are provided, as can be seen from FIG. 3. This twisted structure is effective in amplifying a radially expanding force in the thread itself with resiliency, i.e. a radial elastic recovery property.

Figure 4:
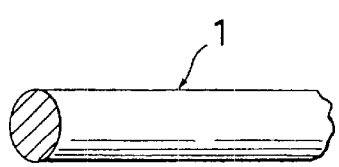
FIG. 4 is a partly broken perspective view of another exemplary mode of the first thread, which shows a single yarn mode thereof.
Figure 5:
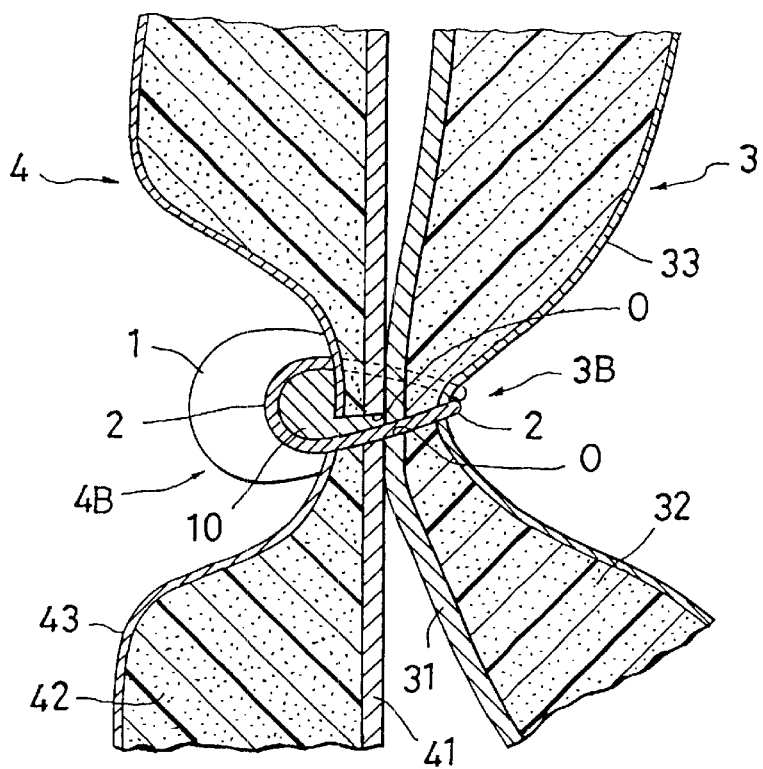
FIG. 5 is a fragmentary sectional view taken along the line V—V in FIG. 2.

Alternatively, in place of such twisted thread mode, a simple thread mode of generally circular cross-section may be employed as shown in FIG. 4, which is not only of elastic and flexible property, but also is of a thickness about 5 to 20 times that of the second thread (2). Of course, the thread material used should have a radially elastic recovery force, likewise in the twisted mode described above. In this case, a woolen yarn or other suitable elastic thick thread is preferable. Such simple thread can be directly wound about the bobbin (MB) and fed therefrom directly toward the needle (N) during sewing operation.

In any instance, it is preferable that the first thread (1) should be of a thickness about 5 to 20 times that of the second thread (2) and have such elastic and flexible property as discussed above.

In operation, as typically shown in FIGS. 1 and 2, the first thread (1), be it the twisted thread mode or simple thread mode, is fed towards the sewing needle (N) and intertwisted with the second thread (2) at equidistant intervals in the two juxtaposed covering elements (3) (4), thereby sewing together the covering elements along a predetermined line with a margin (3A, 4A) left therealong. As best seen from both FIGS. 2 and 5, the first thread (1) is partly collapsed resiliently at equidistant intervals by the second thread (2) as indicated by (10), and it is also observed that a part of the thus-collapsed point (10) of first thread (1) is forcibly inserted in the needle hole (0) together with the second thread (2). Such forcible insertion of both two threads (1) (2) in the needle hole (0) completely closes and seals the hole itself against leakage to be set forth. The radial recovery force inherent in the first thread (1) adds to a positive filling and closing of the needle hole (0).

Based on the above-described sewing operation, a plurality of separate cover elements may be sewn together to form a three-dimensional trim cover assembly. FIG. 6 shows a basic three-dimensional trim cover assembly (A) of box-like shape which is formed by sewing at the jointed potions (J) (J'), using the first and second threads (1) (2).

Into the thus-sewn trim cover assembly (A) is injected a liquid foaming material (6A) via a nozzle (N) as shown in FIG. 6. Then, the sewn trim cover assembly (A) is subjected to foaming process by curing the liquid foaming material (6A). During the foaming, since all the seams or needle holes (0) at the jointed portions (J) (J') are completely closed and sealed by the combination of first and second threads (1) (2) as stated above, there is no leakage of the liquid foaming material (6A) through the needle holes (0). As a result, a foam cushion (6) is created within the trim cover assembly (A), without any foaming material being leaked outside the trim cover assembly. A resulting foamed product, i.e. an integral foamed unit of those trim cover assembly and foam cushion, may be used as any desired portion of automotive seat or any desired utility fitting to the seat, as can be seen from FIGS. 7 and 8.

FIG. 7 shows an example where the resulting foamed product is used as a body of headrest (H). In such case, in the process of forming the headrest, a headrest frame with stay portion (8) is placed in the sewn trim cover assembly (A) in advance, and then a foaming is effected as described above to create a foam cushion member (6) integrally with the headrest frame within the trim cover assembly (A), to thereby produce a headrest (H) as in FIG. 7. The headrest (H) may be attached on an automotive seat (S).

FIG. 8 shows another example where the resulting foamed product is used as body of armrest (AM). In that instance, in the process of forming the armrest, an armrest frame is placed in the sewn trim cover assembly (A) in advance, and then a foaming is effected as described above to create a foam cushion (6) integrally with the armrest frame within the trim cover assembly (A), to thereby produce an armrest (AM) as in FIG. 8. Designation (R) denotes a support bracket to support the armrest. As shown, the armrest (AM) may be attached to an automotive seat (S).

In accordance with the present invention, it is appreciated that the thick, elastic sewing thread (1) is inserted in the needs holes (0) together with the ordinary thin sewing thread (2) by means of an ordinary sewing machine, which effectively leads to forcible filling of the needle holes (0) to a maximum degree and thereby insures to close and seal the holes itself completely against any leakage of liquid foaming material (6A) therethrough. Thus, the first thread (1) indeed serves as a leakage preventive member, not to mention its sewing thread function, which means no need for using other special leakage preventive member as found in the prior art. This in turn allows for direct use of an ordinary conventional sewing machine and simple sewing operation that has been normally done hitherto, in the present invention.

By virtue of the foregoing complete filling of needle holes, it is also to be appreciated that;

(i) The foam padding layer (32, 42) in the trim cover assembly may be made small in thickness and density than an ordinary padding layer in order to allow the sewing needle to smoothly stick therethrough, thereby making the sewing operation easy and rapid.

(ii) In each cover element (3, 4), only a surface cover layer (31, 41) may be formed in the margin area (3A, 4A) to seam, without adding any foam padding layer to such margin area. This will allow for easily juxtaposing the two ends of covering elements, at (3A) (4A), and thus smoothly sewing them together. Therefore, the sewing operation is made smooth and rapid.

(iii) As understandable from the designation (5) in FIGS. 6, 7 and 8, some covering elements may be formed only from a covering member of a single layer structure, not such two-layer lamination type as (3) or (4). Because of the above-discussed thick thread insertion, the needle holes formed at the jointed portions (J') in even such single layer of covering member is completely closed and sealed This one-layer covering member (5) may preferably be applied to a non-exposed side of trim cover assembly which is invisible from the outside. Namely, in the case of headrest (H) in FIG. 7, the covering member (5) be applied to a bottom side of the headrest, which is almost invisible. And, in the case of armrest (AM) in FIG. 8, the covering member (5) be applied to a rearwardly facing wall side of the armrest which is also almost invisible.

While having described the present invention as above, it should be understood that the invention is not limited to the illustrated embodiments, but any other modifications, replacements and additions may be applied thereto without departing from the scopes of the appended claims.

What is claimed is:

1. A sewn cover assembly of a type that is to undergo a foaming process wherein a liquid foaming material is injected and cured in and integrally with the sewn cover assembly, comprising:

plural cover elements, each being preformed in a predetermined shape;

said plural cover elements being sewn together via a first thread and a second thread into a predetermined configuration of the sewn cover assembly by means of a sewing machine having a sewing needle and a bobbin means, such that said second thread is fed to said sewing needle while said first thread is fed from said bobbin means towards said sewing needle, wherein said first thread is of an elastic and flexible property and is large in thickness relative to said second thread.

2. The sewing cover assembly as defined in claim 1, wherein said first thread comprises a simple yarn having a large thickness relative to that of said second thread.

3. The sewing cover assembly according to claim 2, wherein said simple yarn is a woolen yarn.

4. The sewn cover assembly according to claim 2, wherein said simple yarn is about 5 to 20 times as thick as said second thread.

5. The sewn cover assembly as defined in claim 1, wherein said first thread comprises a twisted thread which is formed by twisting a long tape of elastic and flexible material to have a large thickness relative to that of said second thread.

6. The sewn cover assembly according to claim 5, wherein said long tape of elastic and flexible material is a long tape of wooly nylon material or a long tape of non-woven fabric material.

7. The sewn cover assembly according to claim 5, wherein said twisted thread is about 5 to 20 times as thick as said second thread.

8. The sewn cover assembly as defined in claim 1, wherein each of said plural cover elements is of at least two-layer lamination structure comprising a surface cover layer and a foam padding layer integral therewith.

9. The sewn cover assembly as defined in claim 1, wherein at least one of said plural cover elements is of one layer structure comprising only one surface cover member while another of said plural cover elements are of at least two-layer lamination structure comprising a surface cover layer and a foam padding layer integral therewith.

10. A product formed by foaming integrally with a sewn cover assembly, comprising;
   plural cover elements, each being preformed in a predetermined shape;
   said plural cover elements being sewn together via a first thread and a second thread into a predetermined configuration of the sewn cover assembly by means of a sewing machine having a sewing needle and a bobbin means, such that said second thread is fed to said sewing needle while said first thread is fed from said bobbin means towards said sewing needle,
   wherein said first thread is of an elastic and flexible property and is large in thickness relative to said second thread; and
   a foam cushion member which is formed in and integral with said predetermined configuration of sewn cover assembly by a foaming process of injecting and curing a liquid foaming material therein.

11. The product as defined in claim 10, wherein said first thread comprises a simple yarn.

12. The product as defined in claim 10, wherein said first thread comprises a twisted thread which is formed by twisting a long tape of elastic and flexible material to have a large thickness relative to that of said second thread.

13. The product as defined in claim 10, wherein each of said plural cover elements is of at least two-layer lamination structure comprising a surface cover layer and a foam padding layer integral therewith.

14. The product as defined in claim 10, wherein at least one of said plural cover elements is of one layer structure comprising only one surface cover member while another of said plural cover elements are of at least two-layer lamination structure comprising a surface cover layer and a foam padding layer integral therewith.

15. The product according to claim 10, wherein said predetermined configuration of sewn cover assembly is a box-like three-dimensional trim cover assembly for headrest, and wherein said product comprises a headrest for use on an automotive seat, said headrest being formed such that a headrest frame is placed in said box-like three-dimensional trim cover assembly and provided therein integrally with said foam cushion member by means of said foaming process.

16. The product according to claim 10, wherein said predetermined configuration of sewn cover assembly is a box-like three-dimensional trim cover assembly for armrest, and wherein said product comprise an armrest for use with an automotive seat, said armrest being formed such that an armrest frame is placed in said box-like three-dimensional trim cover assembly and provided integrally with said foam cushion member by means of said foaming process.

* * * * *